United States Patent [19]
Nelsen

[11] Patent Number: 5,802,597
[45] Date of Patent: Sep. 1, 1998

[54] SDRAM MEMORY CONTROLLER WHILE IN BURST FOUR MODE SUPPORTING SINGLE DATA ACCESSES

[75] Inventor: Pete Edward Nelsen, Plano, Tex.

[73] Assignee: Cirrus Logic, Inc., Fremont, Calif.

[21] Appl. No.: 579,068

[22] Filed: Dec. 22, 1995

[51] Int. Cl.[6] ..................................... G06F 12/04
[52] U.S. Cl. ........................... 711/169; 395/855
[58] Field of Search ..................... 395/478, 479, 395/432, 821, 855; 711/152, 105, 169

[56] References Cited

U.S. PATENT DOCUMENTS

| | | | |
|---|---|---|---|
| 4,924,375 | 5/1990 | Fung et al. | 364/200 |
| 4,975,870 | 12/1990 | Knicely et al. | 395/479 |
| 5,097,445 | 3/1992 | Yamauchi | 365/195 |
| 5,109,330 | 4/1992 | Pfeiffer et al. | 395/479 |
| 5,134,699 | 7/1992 | Aria et al. | 395/425 |
| 5,159,672 | 10/1992 | Salmon et al. | 395/325 |
| 5,239,639 | 8/1993 | Fischer et al. | 395/425 |
| 5,402,388 | 3/1995 | Wojcicki et al. | 365/233 |
| 5,416,743 | 5/1995 | Allan et al. | 365/203 |
| 5,418,924 | 5/1995 | Dresser | 391/425 |
| 5,455,924 | 10/1995 | Shenoy et al. | 395/445 |
| 5,459,851 | 10/1995 | Nakajima et al. | 395/476 |
| 5,463,590 | 10/1995 | Watanabe | 365/230.03 |
| 5,696,912 | 12/1997 | Bicevskis et al. | 395/308 |

*Primary Examiner*—Eddie P. Chan
*Assistant Examiner*—Hiep T. Nguyen
*Attorney, Agent, or Firm*—David H. Tannenbaum; Steven A. Shaw

[57] ABSTRACT

An SDRAM memory controller that provides both burst four and single data transfers while keeping the SDRAM in burst four mode. A memory controller uses a DQMB[7:0] signal and a precharge command to stop the transference of data on the data bus during the time that the last 3 data elements would have been transferred. Specifically, during a single read, DQMB[7:0] is set high for two clock cycles causing the data bus to float during the time that the second and third data elements would have been on the bus. During a single write, DQMB[7:0] is set high for two clock cycles thereby preventing the second and third data elements from being written to memory. During a read, the precharge command causes the bus to float during the time the fourth element would have been on the bus. During a write, the precharge command prevents the fourth data element from being written.

14 Claims, 8 Drawing Sheets

SDRAM MEMORY CONTROLLER WHILE IN BURST FOUR MODE SUPPORTING SINGLE DATA ACCESSES

RELATED APPLICATIONS

This application is related to Ser. No. 08/577,584, SDRAM MEMORY CONTROLLER WITH MULTIPLE ARBITRATION POINTS, Ser. No. 08/577,579, SDRAM DIMM PRESENCE DETECT INTERFACE, and Ser. No. 08/577,351, DYNAMIC ARBITRATION PRIORITY, filed concurrently with this application and hereby incorporated by reference herein. These applications are commonly assigned.

TECHNICAL FIELD OF THE INVENTION

The invention pertains in general to a memory controller in a computer system and more particularly to an SDRAM memory controller.

BACKGROUND OF THE INVENTION

A dynamic random access memory (DRAM) has three signals called row address strobe (RAS), column address strobe (CAS), and write enable (WE). To start an access to a DRAM, the RAS is transitioned low when the row address is stable, then the CAS is transitioned low when the column address is stable. Next, the DRAM is either read from or written to, depending on the state of the WE signal.

A synchronous DRAM (SDRAM), in contrast to a DRAM, has a digital interface that controls banks of DRAM. To access the DRAM banks, the RAS, CAS, and WE signals are encoded into digital commands sent to the digital interface. The digital interface translates the commands into regular DRAM bus cycles and then accesses the DRAM banks.

The primary advantages of using an SDRAM instead of a DRAM are increased speed and flexibility. Since the digital interface controls the DRAM banks, the banks can be accessed individually. Therefore, there can be active rows in each bank open at the same time.

SDRAMs may be advantageously utilized in computer systems having a unified memory architecture (UMA). A computer having a UMA has a single main memory accessed by all system devices, including a central processing unit (CPU) and a graphics controller. A memory controller arbitrates among the memory access requests and grants access to the requesting device having the highest priority.

In order to support different system devices, the SDRAM provides a burst four mode and a single transfer mode. The burst four mode provides four data elements during a single read or write. Likewise, the single transfer mode provides a single data element during a read or write. The mode is determined by the contents of a mode register within the SDRAM's digital circuitry.

The graphics controller requires burst four mode because it needs long bursts of sequential data to refresh a display screen. The CPU, like the graphics controller, usually reads and writes data in burst four mode. By using this mode, the CPU can read or fill a line in a cache with a single memory access request. Accordingly, the SDRAM is usually in burst four mode.

Occasionally, the graphics controller, CPU, or another requesting device will only need to read or write a single data value. In such a case, the simple solution is to change the SDRAM's mode register to single transfer mode and then perform the memory access. However, changing the mode register from burst four mode to single transfer mode requires two clock cycles. In addition, changing the register from single transfer mode back to burst four mode requires an additional two clock cycles. Furthermore, there are considerations such as whether to switch the SDRAM back to burst four mode after completing a single transfer or merely wait and see what mode the next memory access requires.

Thus, changing the mode register in response to memory access requests slows the response time of the SDRAM and introduces other complicated considerations. Therefore, there is a need for a memory controller that can provide both burst four and single data transfers from an SDRAM without changing the contents of the mode register. More specifically, there is a need for a memory controller that can provide burst four and single transfers from an SDRAM without incurring the delay and additional complications inherent in changing the mode register.

SUMMARY OF THE INVENTION

The above and other needs are met by an SDRAM memory controller that provides both burst four and single data transfers while keeping the SDRAM in burst four mode. A memory controller uses a DQMB[7:0] signal and a precharge command to stop the transference of data on the data bus during the time that the last 3 data elements would have been transferred. Specifically, during a single read, DQMB[7:0] is set high for two clock cycles causing the data bus to float during the time that the second and third data elements would have been on the bus. During a single write, DQMB[7:0] is set high for two clock cycles thereby preventing the second and third data elements from being written to memory. During a read, the precharge command causes the bus to float during the time the fourth element would have been on the bus. During a write, the precharge command prevents the fourth data element from being written.

A technical advantage of the present invention is that the latency period for memory access is reduced. As a whole, the memory access requests are granted faster because the delay caused by switching modes is eliminated.

Another technical advantage of the present invention is increased throughput of the computer system. The reduced latency period results in faster responses to memory access requests. Accordingly, the CPU and other requesting devices spend more cycles processing data and less time waiting for it.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
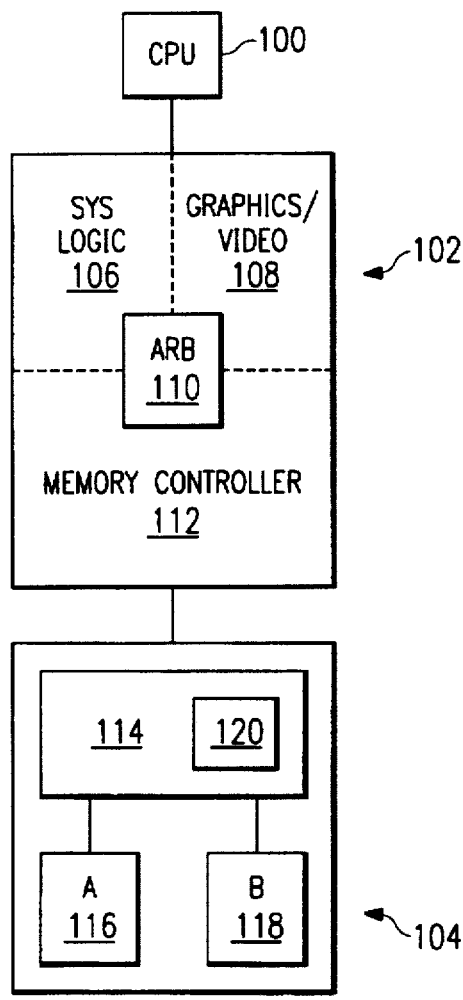
FIG. 1 illustrates a high-level functional block diagram of a computer system according to the present invention.
Figure 6A:
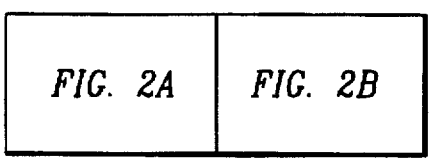
FIG. 6A-6B show how to assemble FIGS. 2 through 4.
Figure 6B:
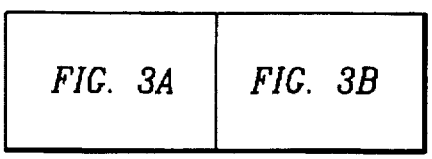
Figure 6C:
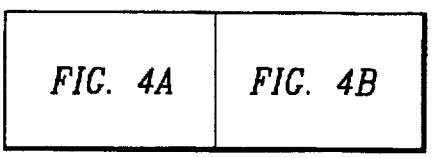

FIG. 1 illustrates a high-level functional block diagram of a computer system having a unified memory architecture (UMA) according to the present invention. Shown are central processing unit (CPU) 100 coupled to integrated controller 102. Integrated controller 102, in turn, is coupled to synchronous dynamic random access memory (SDRAM) 104.

CPU 100 is preferably an X86 compatible CPU. However, the present invention will work equally well with any standard CPU capable of issuing memory access requests as described below.

Integrated logic 102 contains system logic 106, graphics/video controller (hereafter referred to as "graphics controller") 108, arbitration logic 110, and memory controller 112. System logic 106 contains the logic necessary to control the basic operation of the computer system, such as bus logic. Graphics controller 108 controls the generation of graphics data on a display screen (not shown). Graphics controller 108 may receive video data from a real-time video source separate from the computer system or display graphics data received from CPU 100. Arbitration logic 110 receives memory requests from the CPU 100, system logic 106, and graphics controller 108. Then, arbitration logic 110 arbitrates among and grants the highest priority request. Once a device's access request is granted, that device is connected directly to memory controller 112 and uses it 112 to access memory as described below.

It is important to note that arbitration logic 110 arbitrates among all devices in the computer system capable of issuing memory access requests. As discussed above, these devices include the CPU 100 and graphics controller 108. In addition, devices such as peripheral cards, DMA controllers, separate video controllers, and multimedia adapters can send memory access requests to arbitration logic 110 via system logic 106. For most of this discussion, the term "requesting device" is used to generically refer to any device in the computer system capable of issuing memory access requests.

SDRAM 104 includes digital interface 114 and has two banks of DRAM: bank A 116 and bank B 118. To access DRAM banks 116 and 118, commands are sent to digital interface 114. Digital interface 114 translates the commands into regular DRAM bus cycles and then accesses DRAM banks 116 and 118. Digital interface 114 also contains mode register 120. Mode register 120 holds a value indicating whether the SDRAM is in burst four mode or single transfer mode.

Figure 2A:
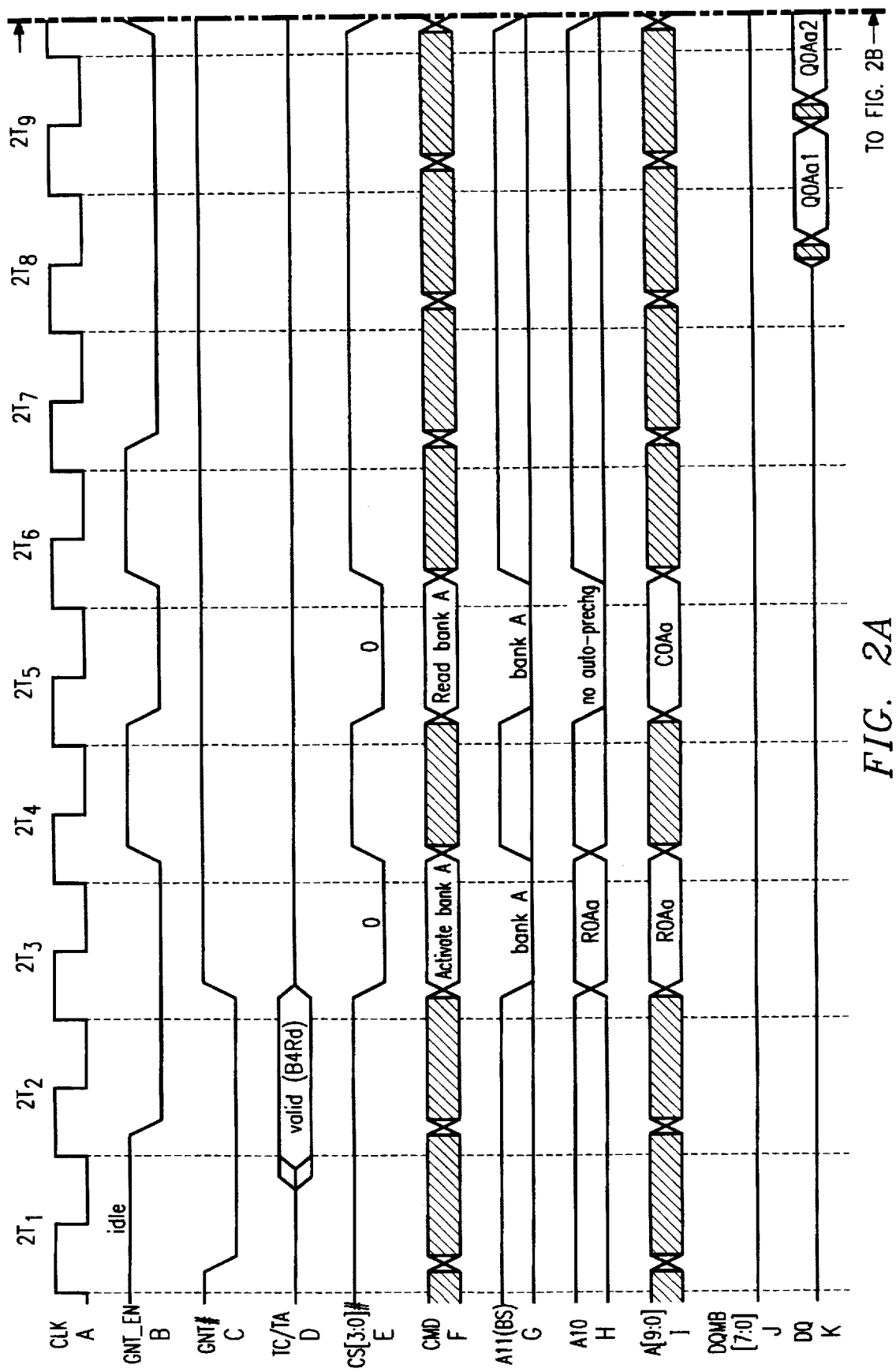
FIGS. 2A-2B are a timing diagram illustrating the signals transferred between the integrated controller and the SDRAM during a burst four read.
Figure 2B:
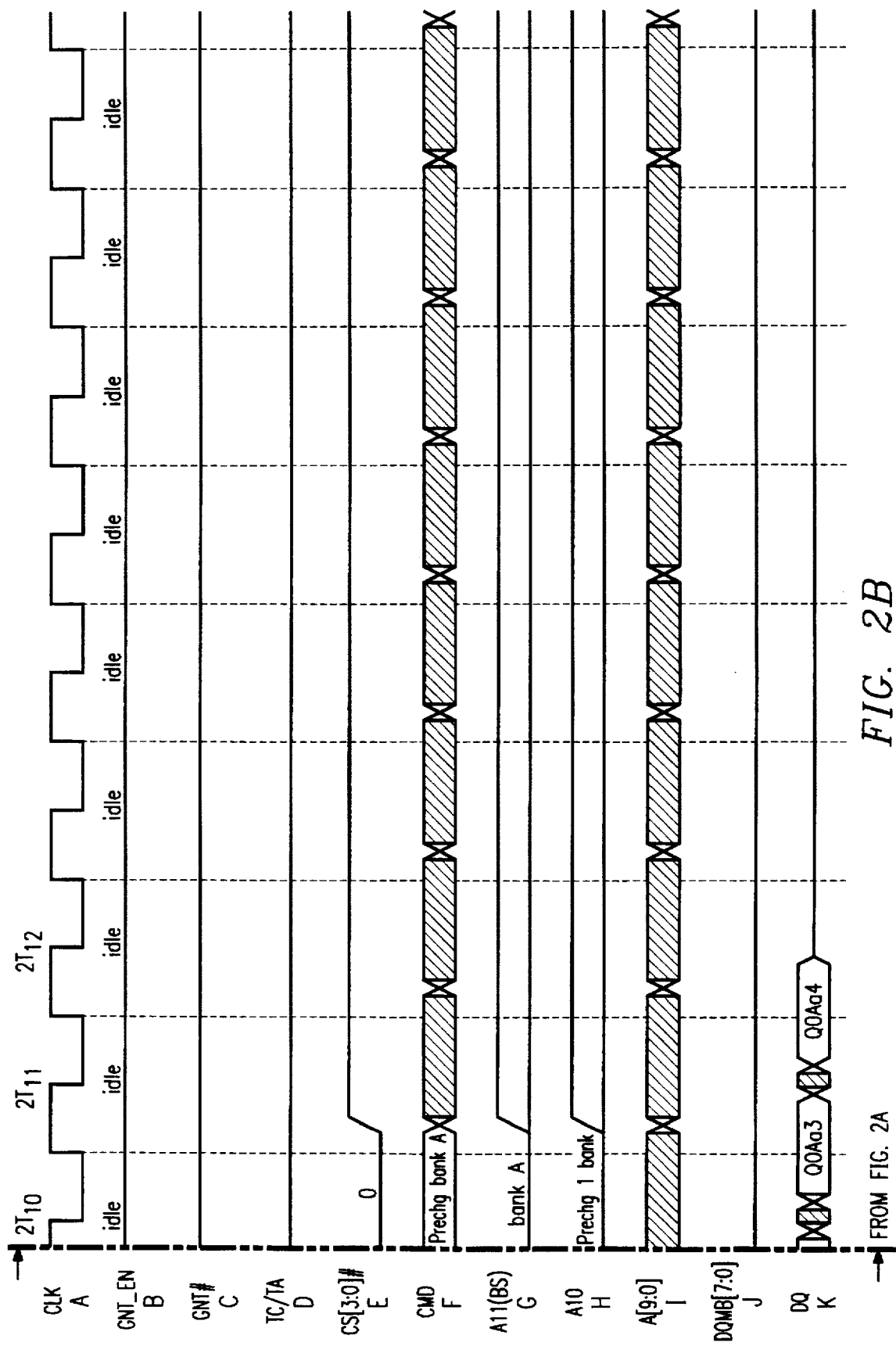
Figure 3A:
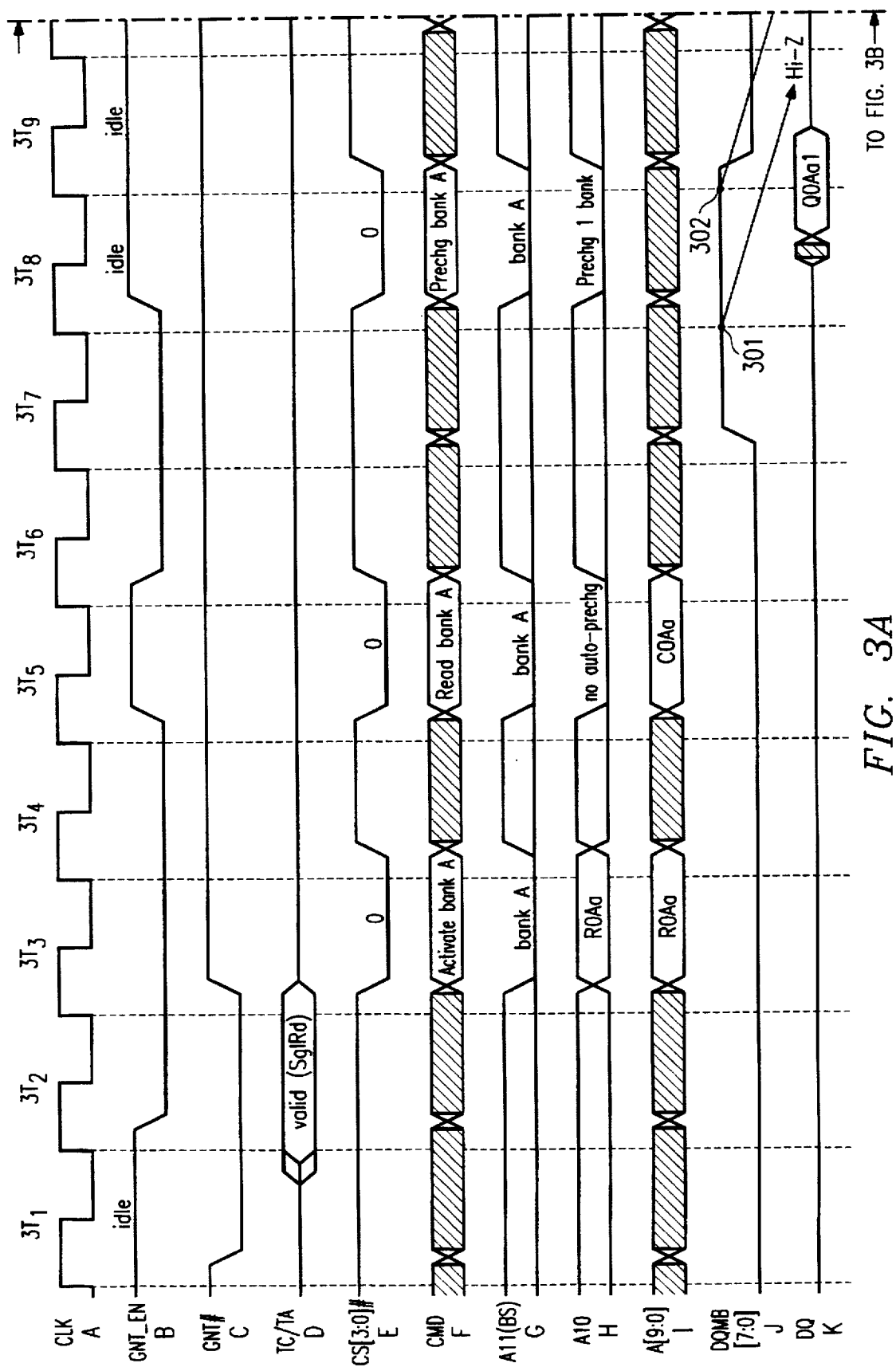
FIG. 3A-3B are a timing diagram illustrating a single read with the SDRAM in burst four mode.
Figure 3B:
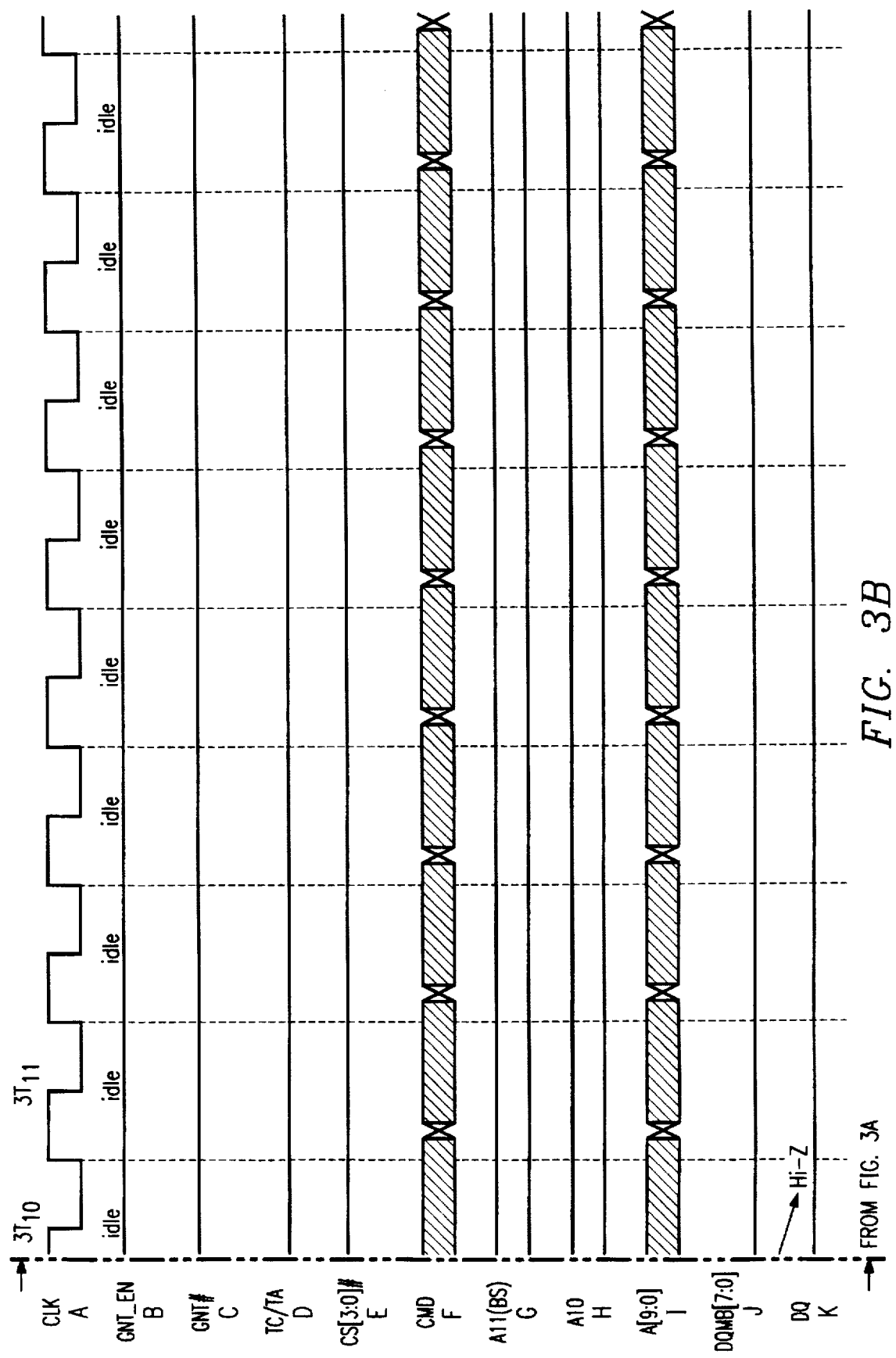

FIGS. 2A-2B show a timing diagram of the signals transferred between integrated controller 102 and SDRAM 104 during a single burst four read. FIG. 2 is provided in order to contrast the difference between a burst four read and a single read in burst four mode as illustrated by FIGS. 3A-3B. Shown are 11 signals: CLK A, GNT_EN B, GNT# C, TC/TA D, CS E, CMD F, A11 G, A10 H, A[9:0] I, DQMB[7:0] J and DQ K.

CLK A is a standard clock signal used to define boundaries for the other signals. GNT_EN B, when high, tells arbitration logic 110 that a memory grant can be accepted. GNT# C is active when low and indicates to the memory controller 112 and the requesting device that the device is being granted a memory access. TC/TA D contains the address of the memory transfer and cycle type information, such as whether the cycle is a read or write or a single transfer or burst four.

CS# E is the chip select for SDRAM 104. CMD F consists of the SDRAM 104 signals CAS, RAS, and WE. These three bits are encoded into the SDRAM commands such as activate/deactivate bank, read, write, and refresh. A11 G selects the bank of DRAM to use.

A10 H is an address bit and has different functions depending on the commands being carried out. During an activate command, A10 H contains the most significant row address bit. During a read or write command, A10 H indicates whether there is going to be an auto-precharge. During a precharge or deactivate command, A10 H indicates whether only one or both banks should be affected.

A[9:0] I contains either the row or column address. During an activate command, A[9:0] I contains the row address. During a read or write command, it contains a column address. During a write, DQMB[7:0] J is used to control which bytes on the data bus are written to SDRAM 104. During a read, DQMB[7:0] J Controls which bytes are driven onto the data bus by SDRAM 104. The data bus is 64 bits wide and each bit of the DQMB[7:0] J signal controls a corresponding byte on the data bus. DQ K is the data bus and bidirectionally carries data being written to or read from memory.

As stated previously, FIGS. 2A-2B show a single burst four read. At cycle 2T1, GNT# C goes low, indicating that a requesting device has been granted access to memory. At cycle 2T2, the requesting device transfers cycle information over TC/TA D indicating a burst four read. As shown by the CMD F and A11 G signals at cycle 2T3, the memory controller activates bank A 116 of SDRAM 104. At cycle 2T3, the row address is on A10 H and A[9:0] I. At cycle 2T5, the column address is on A[9:0] I and the read command is issued. Then, from cycles 2T8 through 2T11 the four data values are sent over DQ K. At cycle 2T10, the precharge command is sent.

FIGS. 3A-3B illustrates a single read in burst four mode. At cycle 3T1, GNT# C goes low, indicating that a requesting device has been granted access to memory. At cycle 3T2, the requesting device transfers cycle information over TC/TA D indicating a single read in burst four mode. As shown by the CMD F and A11 G signals at cycle 3T3, the memory controller activates bank A 116 of the SDRAM. At cycle 3T3, the row address is on A[10] H and A[9:0] I. At cycle 3T5, the column address is on A[9:0] I and the read command is issued. At cycle 3T7, DQMB[7:0] J goes high and remains high until cycle 3T8. DQMB[7:0] J is sampled at the next clock edge after a transition, as indicated by circles 301 and 302. The samples at 301 and 302 cause DQ K to float two cycles later. Thus, asserting DQMB[7:0] J high at cycles 3T7 through 3T8 allows valid data to be carried on DQ K at cycle 3T8 and then causes DQ K to float at cycles 3T9 and 3T10, thereby eliminating the two values that would have been present on DQ K during a burst four read. Therefore, only the data at cycle 3T8 (the first data element) is received by the requesting device.

At cycle 3T8, a precharge command is sent over CMD F. Note that this precharge command occurs two cycles earlier than the precharge command in FIG. 2. The precharge command at cycle 3T8 causes DQ K to float three cycles later, thereby eliminating the fourth data element that would have been on DQ K at cycle 3T11.

Figure 4A:
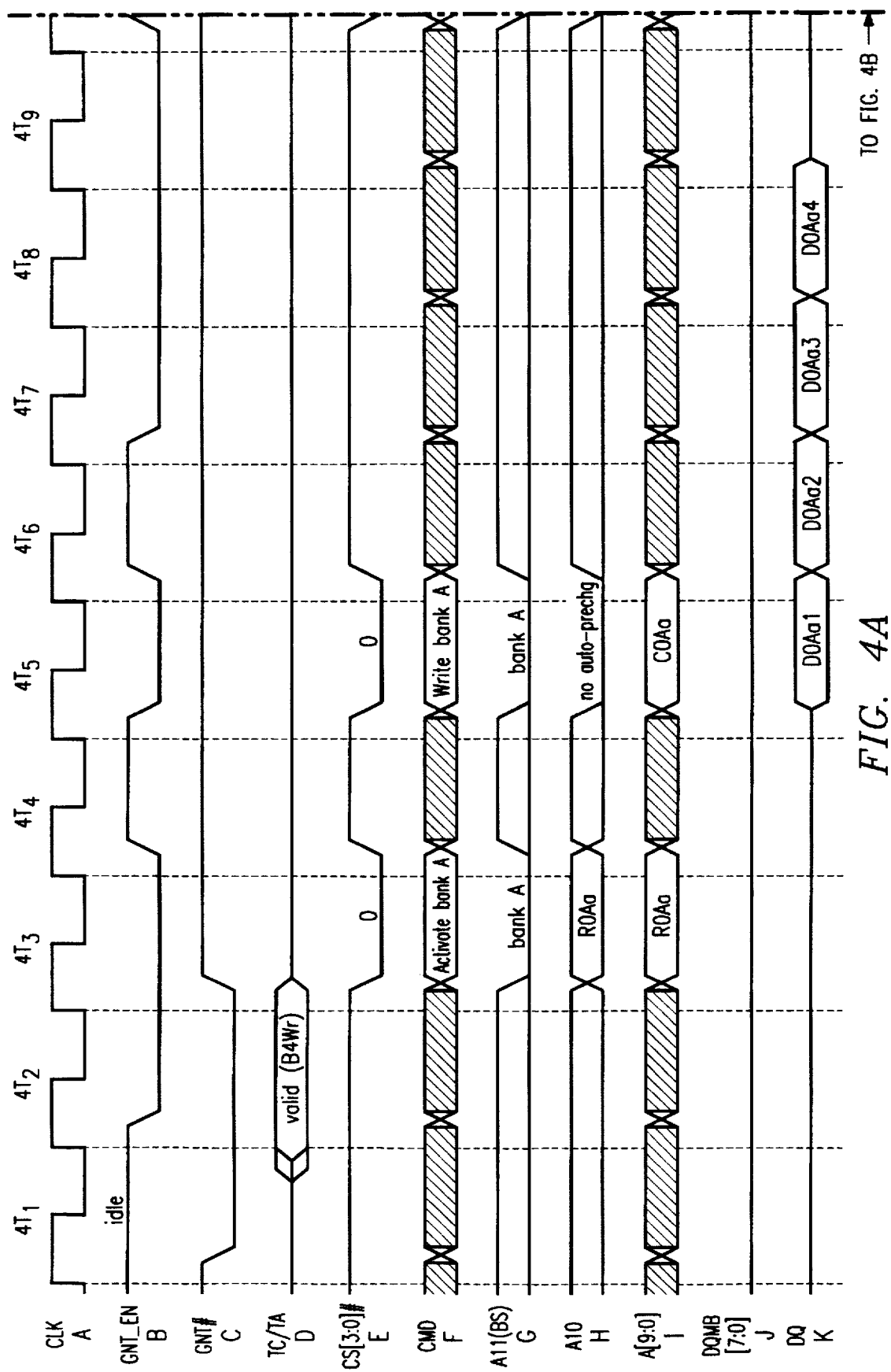
FIG. 4A-4B are a timing diagram illustrating the signals transferred between the integrated controller and the SDRAM during a burst four write.
Figure 4B:
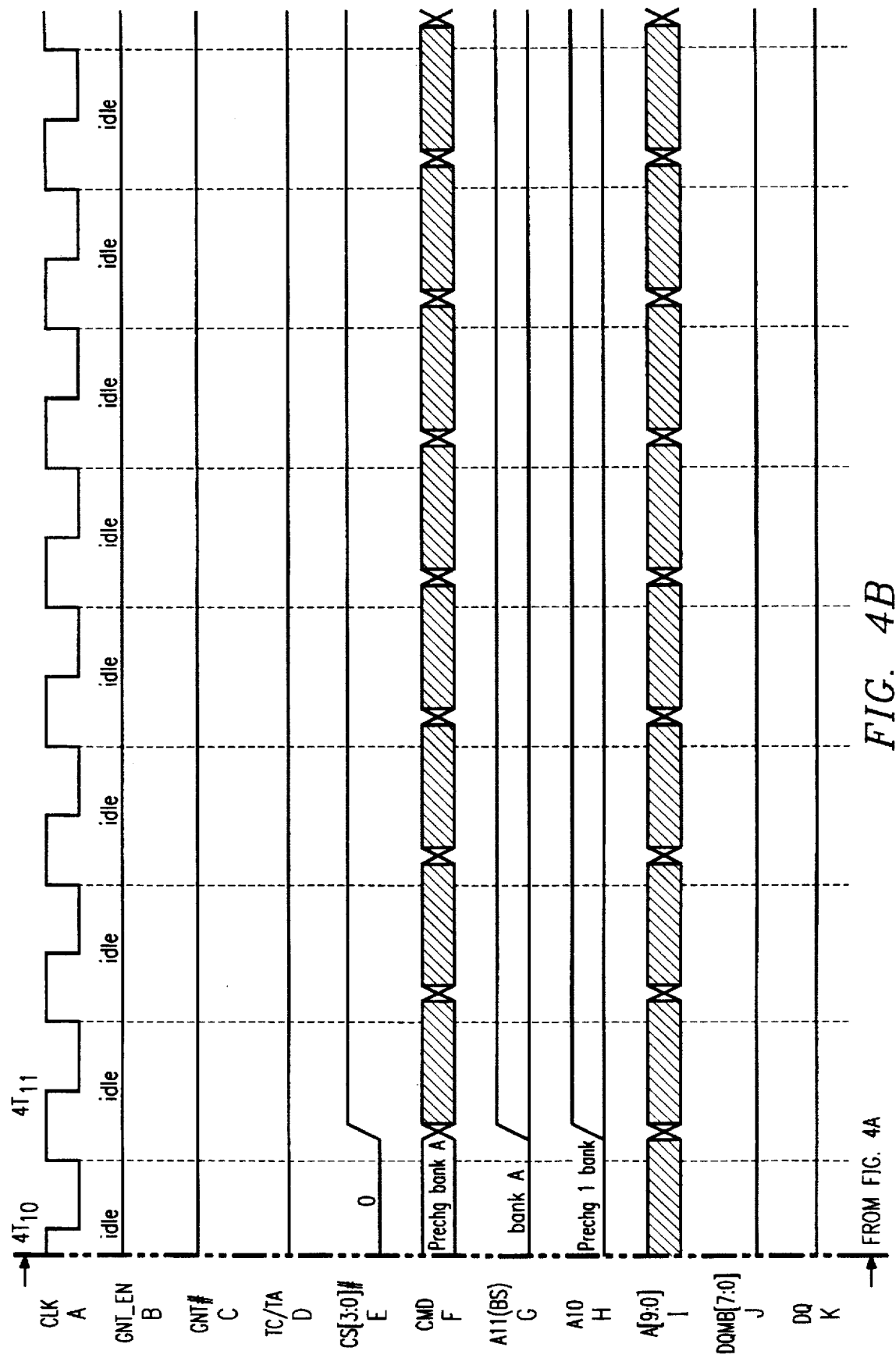

FIGS. 4A–4B show a single burst four write, At cycle 4T1, GNT# C goes low, indicating that a requesting device has been granted access to memory. At cycle 4T2, the requesting device transfers cycle information over TC/TA D indicating a burst four write. As shown by the CMD F and A11 G signals at cycle 4T3, the memory controller activates bank A of SDRAM 104. At cycle 4T3, the row address is on A10 H and A[9:0] I. At cycle 4T5, the column address is on A[9:0] I and the write command is issued. Then, from cycles 4T5 through 4T8 the four data values are sent over DQ K. At cycle 4T10, the precharge command is sent.

Figure 5:
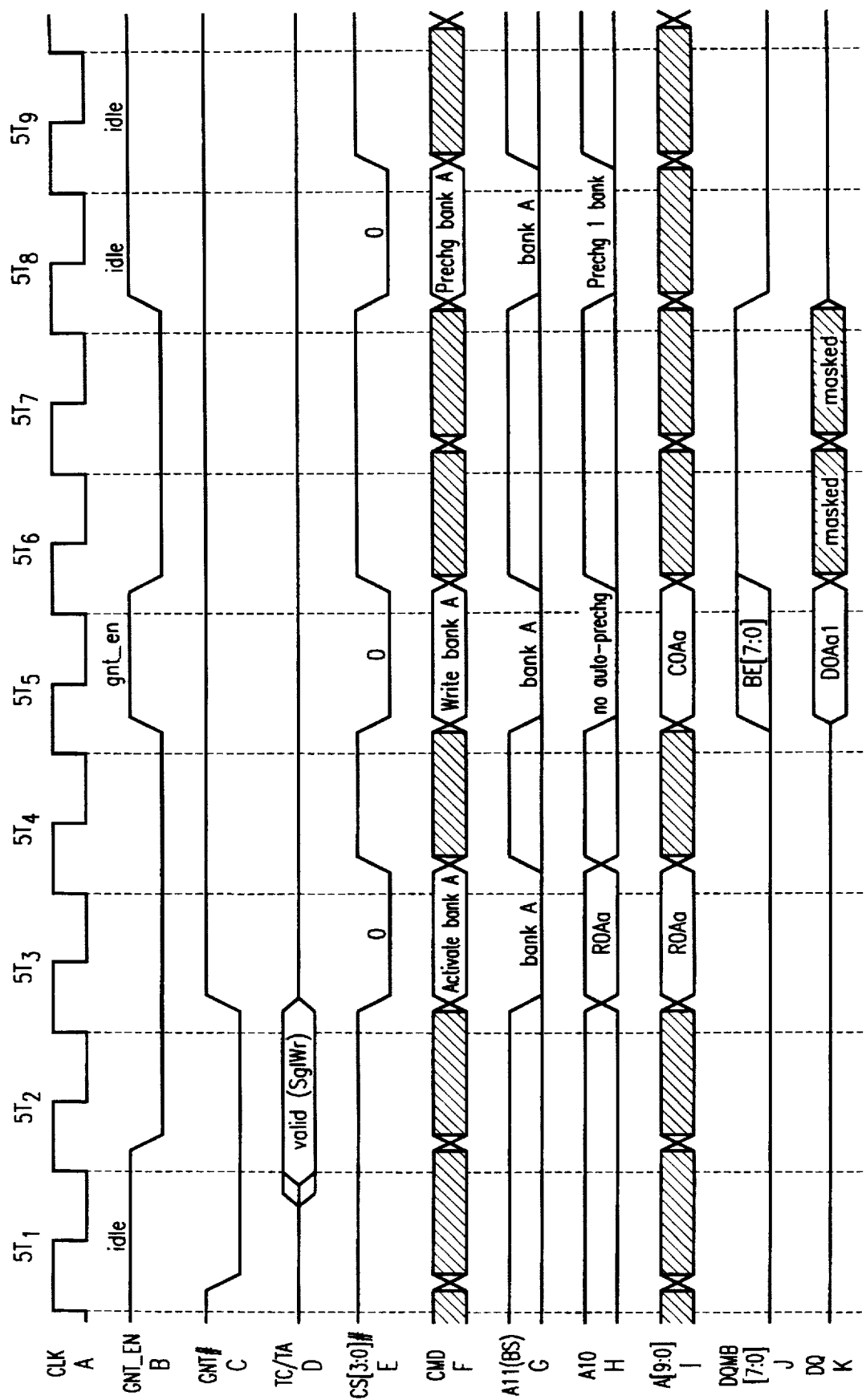
FIG. 5 is a timing diagram illustrating a single write with the SDRAM in burst four mode.

FIG. 5 illustrates a single write in burst four mode. At cycle 5T1, GNT# C goes low, indicating that a requesting device has been granted access to memory. At cycle 5T2, the requesting device transfers cycle information over TC/TA D indicating a single write in burst four mode. As shown by the CMD F and A11 G signals at cycle 5T3, the memory controller activates bank A 116 of SDRAM 104.

At cycle 5T3, the row address is on A10 H and A[9:0] I. At 5T5, the column address is on A[9:0] I and the write command is issued. In addition, the data is output on DQ K at cycle 5T5. At cycle 5T5, DQMB [7:0] J transitions to a state determined by the requesting device. The requesting device uses the 8 bits in DQMB [7:0] J to enable certain bytes on DQ K. Any combination of bytes on DQ K may be enabled. In this manner, the requesting device can write, for example, a byte, word, or double word.

After DQMB[7:0] J selects the bytes on DQ K, DQMB [7:0] J goes high for the next two clock cycles (cycles 5T6 and 5T7). When DQMB[7:0] J goes high, it masks the two data elements on DQ K during cycles 5T6 and 5T7. Thus, those data elements are not written into memory. At cycle 5T8, a precharge command is sent on CMD J. The precharge prevents the fourth data element from being written to memory.

In both FIGS. 3A–3B and 5, the precharge command at cycle 3T8 and 5T8, respectively, terminates the entire memory access two cycles earlier than if a burst four read or write had occurred. Since it takes four cycles to switch the mode register from burst four mode to single transfer mode and back, the embodiment of the present invention illustrated in FIGS. 3A–3B and 5 saves two cycles per memory access. Moreover, the savings is even greater when the accumulated effect of many mode changes are considered.

Although the present invention and its advantages have been described in detail, it should be understood that various changes, substitutions and alterations can be made herein without departing from the spirit and scope of the invention as defined by the appended claims.

I claim:

1. A memory controller in a computer system having a memory and a device issuing a memory access request, comprising:

a data bus for transmitting a plurality of data elements, including a first data element, between the memory and the device in response to the memory access request; and stopping circuitry for stopping the transmission of the plurality of data elements after the first data element has been transmitted, said stopping circuitry comprising:

circuitry for activating a DQMB signal that stops the transmission of a second data element and a third data element; and circuitry for sending a precharge command that stops the transmission of a fourth data element;

wherein said memory controller is in a burst four mode.

2. The memory controller of claim 1, wherein the memory comprises an SDRAM.

3. The memory controller of claim 1, wherein the computer system has a unified memory architecture.

4. The memory controller of claim 1, wherein the memory access request comprises a read request.

5. The memory controller of claim 1, wherein the memory access request comprises a write request.

6. A memory controller for transmitting data between a requesting device sending a memory access request and a memory, comprising:

transmitting means for transmitting data elements, including a first data element, between the requesting device and the memory in response to the memory access request; and eliminating means for eliminating the data elements after the first data element has been transmitted said eliminating means comprising:

means for activating a DQMB signal that eliminates a second data element a third data element; and means for sending a precharge command that eliminates a fourth data element;

wherein said memory controller is in a burst four mode.

7. The memory controller of claim 6, wherein the memory comprises an SDRAM.

8. The memory controller of claim 6, wherein the computer system has a unified memory architecture.

9. The memory controller of claim 6, wherein the memory access request comprises a read request.

10. The memory controller of claim 6 wherein the memory access request comprises a write request.

11. A method of transferring data elements between a requesting device and a memory, comprising the steps of:

transferring a plurality of data elements, including a first data element, on a memory bus; and blocking the transference of all of the plurality of data elements except the first data element said blocking step comprising the steps of:

activating a DQMB signal that blocks the transmission of a second data element and a third data element; and sending a precharge command that stops the transmission of a fourth data element;

wherein said memory controller is in a burst four mode.

12. The method of claim 11, wherein the memory comprises an SDRAM.

13. The method of claim 11, wherein the computer system has a unified memory architecture.

14. A memory controller in a computer system having a unified memory architecture, an SDRAM memory in a burst four mode, and a device issuing a memory access request, comprising:

a data bus for transmitting a plurality of data elements, including a first data element, between the SDRAM memory and the device in response to the memory access request; and stopping circuitry for stopping the transmission of the plurality of data elements after the first data element has been transmitted, said stopping circuitry comprising:

circuitry for activating a DQMB signal that stops the transmission of a second data element and a third data element; and circuitry for sending a precharge command that stops the transmission of a fourth data element.

* * * * *